United States Patent [19]

Su

[11] Patent Number: 4,899,371

[45] Date of Patent: Feb. 6, 1990

[54] COIN SLOT STRUCTURE FOR COIN CALL TELEPHONE APPARATUS

[76] Inventor: Lih-Chuan Su, No. 1, Alley 33, Lane 788, Hsin Chuan Chih Rd., Kaohsiung, Taiwan

[21] Appl. No.: 343,208

[22] Filed: Apr. 26, 1989

[51] Int. Cl.[4] ........................ H04M 17/02; G07F 5/06

[52] U.S. Cl. .................................... 379/146; 194/229; 194/345; 194/322

[58] Field of Search ........................ 379/146, 143, 155; 194/229, 320, 322, 344, 319, 316, 334, 338, 345

[56] References Cited

U.S. PATENT DOCUMENTS 3,488,444 1/1970 Porsner .............................. 379/155

*Primary Examiner*—Stafford D. Schreyer
*Attorney, Agent, or Firm*—Varndell Legal Group

[57] ABSTRACT

A new coin slot structure for coin call telephone apparatus includes photodetectors set to identify the coins inserted therein, so as to allow three kinds of coins of different value be continuously inserted into the apparatus through the slot to extend the connection time, wherein the additional coins inserted will be automatically returned.

10 Claims, 3 Drawing Sheets

COIN SLOT STRUCTURE FOR COIN CALL TELEPHONE APPARATUS

BACKGROUND AND SUMMARY OF THE INVENTION

Regular public telephone includes two slots for insertion of respective coins of two different value. During insertion of coins, one may hastily insert a coin in the wrong slot. If one inserts a big coin in the smaller slot, the coin can not be inserted; or if a small coin is inserted into the bigger slot, the coin will not work to connect the line. It is the scope of the present invention to provide a slot structure for use in a coin call telephone apparatus to accept coins of three different value so as to facilitate continuous insertion of different coins through one single slot.

The features and advantages of the present invention may be fully understood from the following detailed description of the preferred embodiments, considered in conjunction with the annexed drawings.

DETAILED DESCRIPTION OF THE PREFERRED EMBODIMENTS

Figure 2:
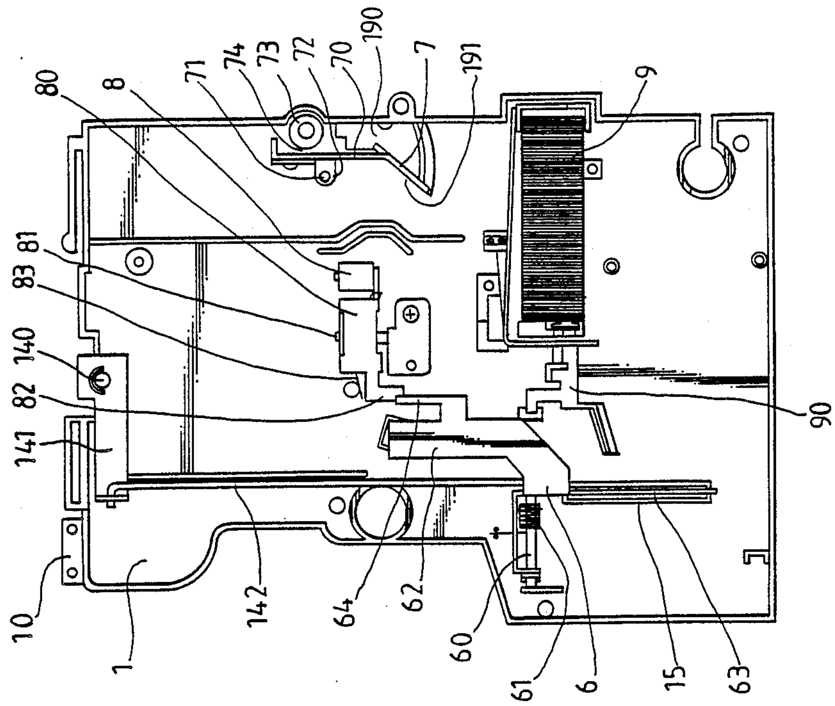
FIG. 2 is a rear view of the present invention.
Figure 1:
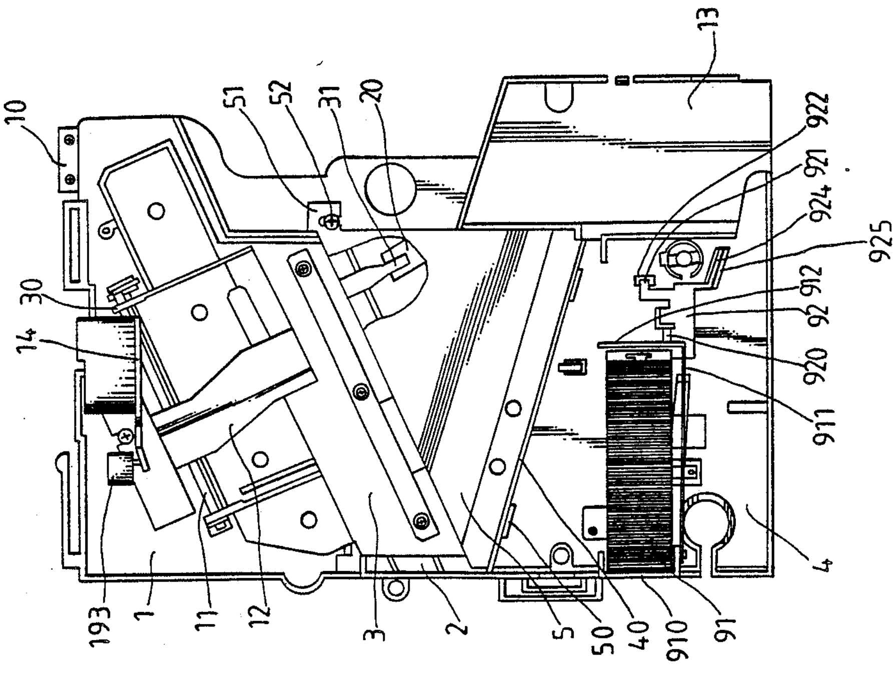
FIG. 1 is a front view of the present invention.
Figure 4:
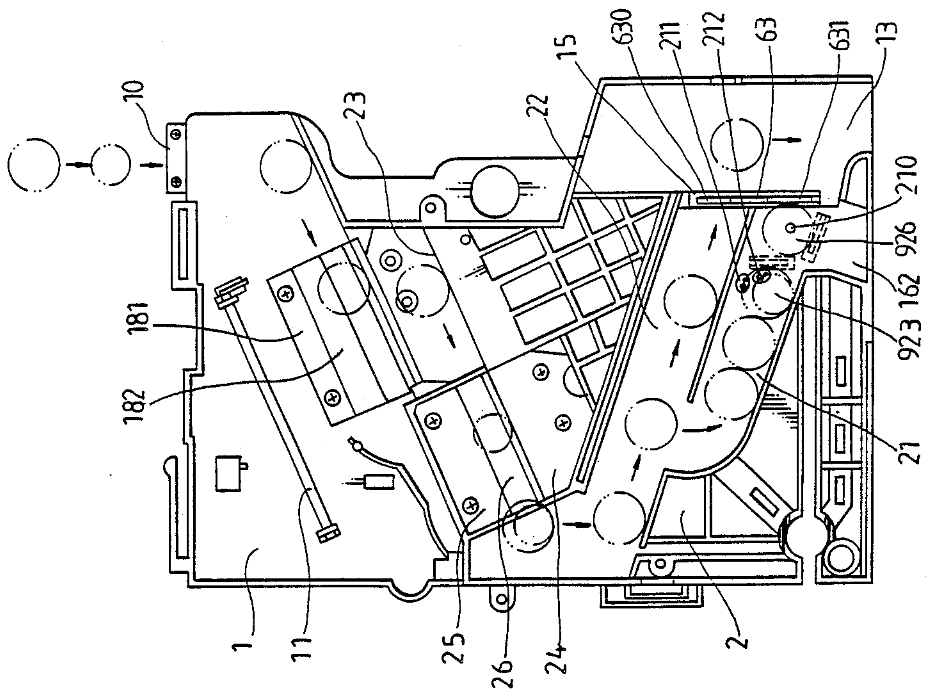
FIG. 4 is a rear view of the base assembled with the middle cover plate.

Referring to FIGS. 1 and 2, the present invention includes a base 1, a middle cover plate 2, an actuating plate 3, a bottom cover plate 4, and an outer cover plate 5. A slot holder 10 is set at the upper right side of the base 1 for insertion therethrough of three certain coins (for example: cent, nickel and quarter). The middle cover plate 2 is attached to the base 1 at the right lower position covering over half of the area (as shown in FIG. 4). A mandrel 11 is set at an upper position on the base 1 and connected with the bilateral ribs 30 of the actuating plate 3. The actuating plate 3, which includes an L-shaped rod 31 set at the right lower end to insert through a hole 20 penetrating through the middle cover plate 2 and the base 1, is forced by a spring plate 12 to constantly face toward the base 1 with its bottom end covering over the upper part of the middle cover plate 2. The bottom cover plate 4 which is set below the middle cover plate 2 is having a right side portion matched with the base 1 to define a coin outlet chamber 13, and comprising an elongated convex edge 40 at the upper side for connection with the bottom ribs 50 of the outer cover plate 5. The outer cover plate 5 includes an extension 51 integrally set at the right upper angle through which the outer cover plate 5 is fixedly connected with the base by a screw 52. A space is arranged between the outer cover plate 5 and the actuating plate 3 to permit turning of the actuating plate 3 therearound.

Figure 5:
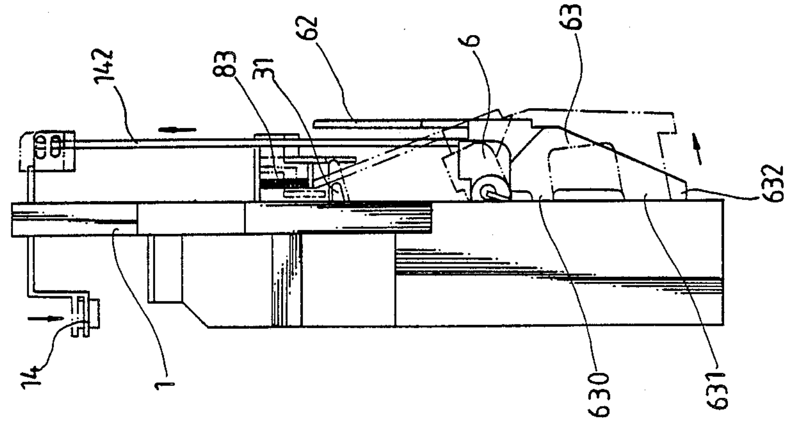
FIG. 5 is a right side view of the present invention.

When the hand set is hung on the telephone apparatus, the suspension plate 14, which is set at the right upper side of the base, will be forced to displace downward along counter-clockwise direction by means of a revolving shaft 140 (as shown in FIG. 2) to let the linking plate 141, which is extended from the suspension plate 14 to the back side of the base 1, to move upward. At this moment, the pull rod 142, which is vertically connected to the left end of the linking plate 141, is forced to pull a coin discharging mechanism 6. The coin discharging mechanism 6 is revolvably connected to the base 1 by means of a shaft 60, comprising an elongated pressure plate 62 set above the shaft 60 and a stop plate 63 set below the shaft 60. A return spring 61 is arranged to pull away the elongated pressure plate 62 of the coin discharging mechanism 6 from the base 1 (as shown in FIG. 5) and to let the stop plate 63 move toward the base 1 so as to let the upper stop board 630 and the lower stop board 631 of the stop plate 63 be set in the rectangular hole 15 of the base 1 and to further let the stop plate 63 be firmly positioned at a certain position by means of the act of the bottom block 632 of the stop plate 63 against the rectangular hole 15. Because the bottom end of the pull rod 142 is connected to the outer side of the shaft 60, when the pull rod 142 is moved upward, the elongated pressure plate 62 will be turned to move around the shaft 60 and to become inclined against the base 1 to force the L-shaped rod 31 so as to let the actuating plate 3 be turned around the mandrel 11, that is, to let the actuating plate 3 leave away from the base 1 and the middle cover plate 2. At this moment, the coins inserted therein will drop to the outer cover plate 5 to slide along the elongated convex edge 40 into the coin outlet chamber 13 to return the coins.

Figure 3:
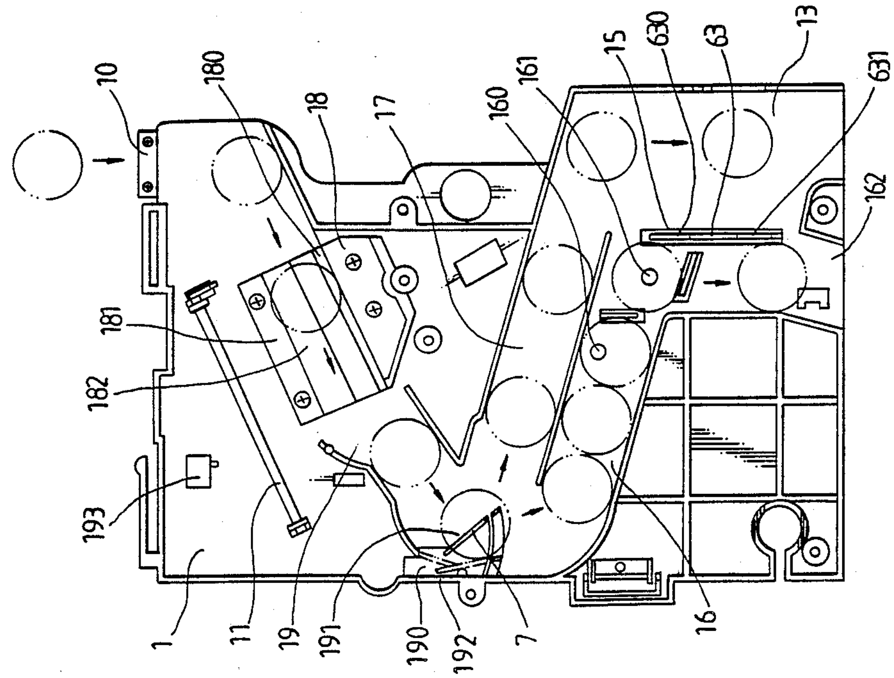
FIG. 3 is a rear view of the base of the present invention.

If coins are still available in the telephone apparatus after termination of a call, as soon as the hand set is hung up, the upper and lower stop boards 630 and 631 of the stop plate 63 are driven to move against the shaft 60 to not block up the lower slot channel 16 of the base 1 and the lower slot channel 21 of the middle cover plate 2 (referring to FIGS. 3 and 4), so as to let the coins drop into the coin outlet chamber 13 to return the coins. If excessive coins are inserted into the telephone apparatus, the excessive coins will drop into the coin outlet chamber 13 through the upper slot channel 17 of the base 1 and the upper slot channel 22 of the middle cover plate 2 to return the coins.

When diversified coins are inserted through the slot holder 10, the big coins will drop to the top slope 180 of a trapezoid block 18 which is mounted on the base 1 to match with a rectangular block 181 to define a groove 182 therebetween. Because the diameter of the big coins is larger than the width of the groove 182, the big coins will be kept in contact with the rectangular block 181 before rolling into the slot channel 19. There is provided a buffer plate 7 fixedly connected to the base 1 at the back side (referring to FIG. 2) and set at the left side by the slot channel 19 to penetrate through a space 190 set at the left side of the base 1. An extension plate 70 is straightly extended upward from the buffer plate 7, which extension plate 70 includes a side block 73 through which a shaft 71 is set to connect to the base such that the buffer plate 7 becomes revolvably connected to the base 1. A magnet 73 is mounted on the base 1 and set opposite to the side block 72 to attract the extension plate 70 so as to constantly retain the buffer plate 7 at a certain position. Because the buffer plate 7 is stopped at the inner side 191 of the space 190, a gap 74 is left between the extension plate 70 and the magnet 73 to reduce the magnetic force of the magnet 73 acted on the extension plate 70. When a big coin is dropped to the buffer plate 7, the gravity of the big coin will force the buffer plate 7 to displace in the space 190 to provide a buffering effect (as shown in FIG. 2). Thus, the big coin will not directly hit the stop rod 192 to spring at the slot channel 17 into the coin outlet chamber, and it will smoothly drop into the lower slot channel 16. Therefore, the big coins can be continuously inserted until the slot channel 16 is fully occupied.

If medium or small coins are inserted through the slot holder 10, when the coins are dropped to the slope 180 of the trapezoid block 18, they are not in contact with the rectangular block 181 during rolling because the diameter of the coins are smaller than the width of the groove 182. Therefore, the coins, through the effect of the slope 180, will slide along the groove 182 to drop into the slot channel 23 of the middle cover plate 2 (as shown in FIG. 4) to run to a trapezoid block 24. The trapezoid block 24, similar to the trapezoid block 18 of the base 1, includes a rectangular block 25 to define a groove 26. Because the groove 26 is wider than the diameter of the medium and small coins, the coins can smoothly run through the groove 26 into the lower slot channel 21.

Please refer to FIGS. 2 and 3 again. A magnet 8 is fixedly mounted on a turning plate 80 set at the back side of the slot channel 19 of the base 1. The turning plate 80 is turnably connected to the base 1 through a fixed axle 81 and includes an extension 82 spaced away from the forked portion 64 of the elongated pressure plate 62. Because the turning plate 80 is controlled by a spring 83 (referring to FIG. 5) to let the magnet 8 be in contact with the base, if a false coin of metal material is inserted, the false coin will be attracted by the magnet 8 to reject the use of the false coin. As soon as the telephone is hung up, the forked portion 64 will press on the extension 82 to let the turning plate 80 move so as to let the magnet 8 lease away from the base 1 to release the false coin. The released false coin will run through the slot channel 19. Because the running speed of the false coin is reduced, when the false coin hits the buffer plate 7, the buffer plate 7 will only displace for a limited range to prevent the false coin from running into the lower slot channel 16, and therefore, the false coin will run through the upper slot channel 17 into the coin outlet chamber 13 for reimbursement.

Figure 6:
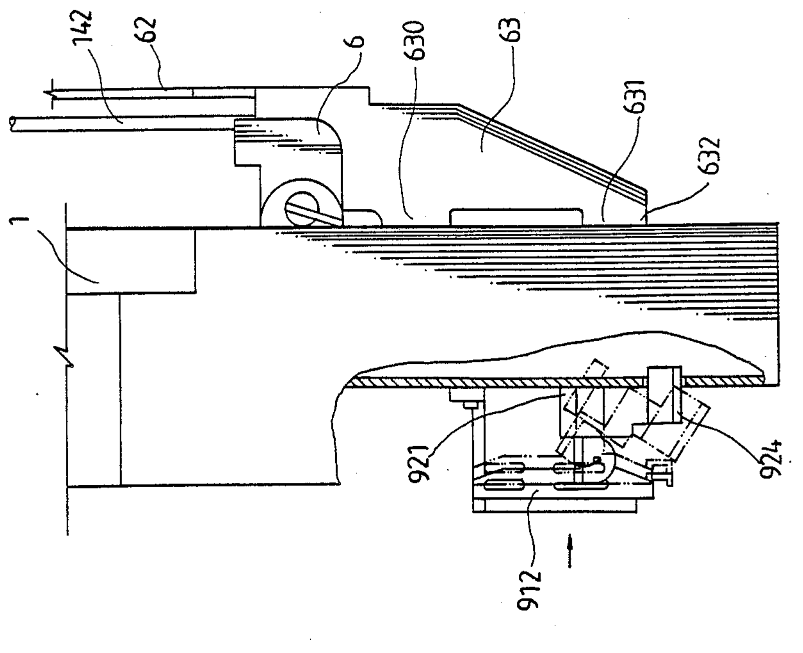
FIG. 6 is a partly right side sectional view of the present invention.

Please refer to FIGS. 3 and 4 again. Two photodetectors 160 and 161 are set in the lower slot channel 16 of the base 1, wherein the first photodetector 160 is to identify if there is coins in the lower slot channel 16 so as to determine if further insertion of coins is allowed; the second photodetector 161 is to count service time according to the value of the coin inserted. As soon as the line is connected and the control button is pressed down, the support means 90 of the coil 9 which is set at the right lower side of the base 1 will be released to let inserted coins drop into the coin box 162 so as to let the line be communicated for calling. There is also provided a coil 91 set at the left lower side of the bottom cover plate 4 to connect a support means 92 so as to control the action of line connection of medium and small coins through the lower slot channel 21 of the middle cover plate 2. Three photodetectors 210, 211 and 212 are respectively set in the lower slot channel 21, wherein the first photodetector 210, similar to the photodetector 161, is served to count service time according to the value of the coin inserted, and the second and third photodetectors 161 and 162 are to identify the kind of the coins inserted. If a coin blocks light from the photodetector 212, it is identified a small coin. If a coin blocks light from the second and third photodetectors 212 and 213 simultaneous, it is identified a medium coin. Please refer to FIG. 6. The structure of the coil 9 is same as the coil 92. When the line is connected and the control button is pressed, the moving plate 910 is turned to connect to the coil 91 to receive the signal of line connection, the vertical end 912 of a L-shaped linking rod 911, which is to connect the moving plate 910 to the round rod 920 of the support means 92, is moved toward the bottom cover plate 4 to force the round rod 92 so as to let the upper support plate 921 of the support means 92 move into the upper hole 922 to stop the coin 923 in the lower slot channel 21 and to let the lower support plate 924 of the support means 92 be withdrawn from the bottom hole 925 to let the coin 926 drop into the coin box 162 and to turn the line on for communication. As soon as the coin 926 is dropped into the coin box 612, the lower support plate 924 is returned to set in the bottom hole 925 and the upper support plate 921 is withdrawn from the upper hole 922 to let the coin 923 fall to the lower support plate 924 to be in a waiting status. As soon as the service time that the coin 926 is offered is up, the coil 91 will be triggered by the signal to let the moving plate 910 be in contact with the coil 91 once again, to repeat the said motion so as to extend line connection time for communication.

Please refer to FIG. 1 again. When hand set in picked up, the suspension plate 14 is automatically moving upward to trigger a microswitch 193 to turn on power supply to initiate the operation of the present invention. When hand set is hung up, the suspension plate 14 is released from the micro-switch 193 to turn off power supply and to terminate the operation of the present invention.

I claim:

1. A coin slot structure for coin call telephone apparatus, including:

a base having a slot holder set at the upper right side for insertion therethrough of three different kinds of coins, a mandrel set at the right upper side for mounting thereon of an actuating plate, a suspension plate movably set at the right upper side through a revolving shaft, said suspension plate comprising a linking plate extending to the back side of said base to connect to a pull rod to pull a coin discharging mechanism;

a middle cover plate being fixedly mounted on said base at the right lower side to cover over half of the area;

an actuating plate including an L-shaped rod set at the right lower end to penetrate through said base, and being forced by a spring plate to constantly face toward said base with its bottom end covering over the upper part of said middle cover plate;

a bottom cover plate being set below said middle cover plate, having a right side portion to match with said base to define a coin outlet chamber and comprising an elongated convex edge set at the upper side; and an outer cover plate having bottom ribs set at both sides to connect with said elongated convex edge of said bottom cover plate, and comprising an extension integrally set at the right upper angle through which the outer cover plate is fixedly connected with said base by a screw, said outer cover plate being arranged to space away from said actuating plate to provide a space for turning therearound of said actuating plate.

2. A coin slot structure for coin call telephone apparatus according to claim 1, wherein said coin discharging mechanism is revolvably connected to said base by means of a shaft, comprising an elongated pressure plate set above said shaft and a stop plate set below said shaft, said stop plate being comprised of an upper stop board and a lower stop board, and a return spring being arranged to pull away said elongated pressure plate from said base and to let said stop plate move toward said base so as to let said upper stop board and said lower stop board of said stop plate be set in a rectangular hole, which is made on said base, and to further let said stop plate be firmly positioned at a certain position by means of the act of a bottom block against said rectangular hole, which said bottom block is integrally set at the bottom side of said stop plate.

3. A coin slot structure for coin call telephone apparatus according to claim 1 wherein said upper and lower stop boards of said stop plate are driven to move against a shaft to not block up the lower slot channel of said base and the lower slot channel of said middle cover plate, as soon as hand set is hung up, so as to let inserted coins drop into a coin outlet chamber to return the coins.

4. A coin slot structure for coin call telephone apparatus according to claim 1 wherein the bottom end of said pull rod is connected to the outer side of said shaft, and wherein when said pull rod is moved upward, said elongated pressure plate is turned to move around said shaft to force said L-shaped rod so as to let said actuating plate be turned around said mandrel to let said actuating plate leave away from said base and said middle cover plate and to let the inserted coins drop to said outer cover plate to slide along said elongated convex edge into said coin outlet chamber to return the coins.

5. A coin slot structure for coin call telephone apparatus according to claim 1 wherein one upper slot channel each is set above the lower slot channel of said base and the lower slot channel of said middle cover plate respectively, to let excessive coins drop therethrough into said coin outlet chamber for reimbursement.

6. A coin slot structure for coin call telephone apparatus according to claim 1, wherein a trapezoid block is mounted on said base to match with a rectangular block to define a groove therebetween, said groove having a width smaller than the diameter of said big coin, said trapezoid block comprising a top slope, and wherein when big coins are inserted through said slot holder, the coins will drop to said top slope of said trapezoid block to run into said upper slot channel of said base.

7. A coin slot structure for coin call telephone apparatus according to claim 6, wherein a buffer plate is fixedly connected to said base at the back side and set at the left side by said upper slot channel of said base to penetrate through a space set at the left side of said base; an extension plate being straightly extended upward from said buffer plate, which extension plate includes a side block through which a shaft is set to connect to said base to let said buffer plate be revolvably connected to said base; a magnet being mounted on said base and set opposite to said side block to attract said extension plate so as to constantly retain said buffer plate at a fixed position; said buffer plate being stopped at the inner side of said space to define a gap between said extension plate and said magnet so as to reduce the effect of the magnetic force applied on said extension plate; wherein when a big coin is dropped to said buffer plate, the gravity of the big coin will force said buffer plate to displace within said space so as to provide a buffering effect to not let the big coin directly hit said stop rod to spring at said slot channel of said base into said coin outlet chamber.

8. A coin slot structure for coin call telephone apparatus according to claim 7, wherein when medium or small coins are inserted through said slot holder to drop to said slope of said trapezoid block, the coins are not in contact with said rectangular block during rolling because the diameter of the coins are smaller than the width of said groove, such that the coins are to slide along said groove to further drop into the slot channel of said middle cover plate to run to a trapezoid block which serves as a means similar to the trapezoid block of said base.

9. A coin slot structure for coin call telephone apparatus according to claim 1, wherein a magnet is fixedly mounted on a turning plate set at the back side of the slot channel of said base through a fixed axle, said turning plate including an extension space away from the forked portion of said elongated pressure plate, and being controlled by a spring to let said magnet be in contact with said base to attract any false metal coin inserted therein, and wherein as soon as the telephone is hung up, said forked portion is to press on said extension to let said turning plate move and to let said magnet leave away from said base to release the false coin and to let the released false coin run through the slot channel of said base, such that when the false coin hits said buffer plate, the buffer plate will only displace for a limited range to prevent the false coin from running into said lower slot channel of said base, and therefore, the false coin will run through the upper slot channel said base into said coin outlet chamber for reimbursement.

10. A coin slot structure for coin call telephone apparatus according to claim 1, wherein a coil is mounted on said bottom cover plate to connect with a support means, such that when the line is connected and the control button is pressed, a moving plate is turned to connect to said coil to receive the signal of line connection, the vertical end of a L-shaped linking rod, which is to connect said moving plate to the round rod of said support means, is moved toward said bottom cover plate to force said round rod so as to let the upper support plate of said support means move into an upper hole to stop any coin in said lower slot channel of said middle cover plate and to let the lower support plate of said support means be withdrawn from a bottom hole to let the coin drop into a coin box and to turn the line on for communication; as soon as the coin is dropped into said coin box, said lower support plate is returned to set in said bottom hole and said upper support plate is withdrawn from said upper hole to let the coin fall to said lower support plate to be in a waiting status; as soon as the service time that the coin is offered is up, said coil will be triggered by the signal to let said moving plate contact said coil once again, to repeat the said motion so as to extend line connection time for calling, and wherein said base also comprises a coil having a structure same as the coil of said bottom cover plate, to control line connection triggered by big coin.

* * * * *